United States Patent [19]

In-Albon et al.

[11] Patent Number: 4,852,472
[45] Date of Patent: Aug. 1, 1989

[54] APPARATUS FOR PREPARING COFFEE

[76] Inventors: Jean-Paul In-Albon, Rue des Pontets, CH-1917 Ardon; Heinz-Anton Eicher, Säntisstrasse 19, CH-8640 Rapperswil, both of Switzerland

[21] Appl. No.: 218,992

[22] Filed: Jul. 14, 1988

[30] Foreign Application Priority Data

Jul. 17, 1987 [CH] Switzerland .......................... 2720/87

[51] Int. Cl.⁴ ............................................... A47J 31/34
[52] U.S. Cl. ..................................... 99/289 R; 99/297; 99/302 P
[58] Field of Search ................. 99/279, 289 R, 289 P, 99/289 D, 287, 297, 300, 302 P; 426/433

[56] References Cited

U.S. PATENT DOCUMENTS

| | | | |
|---|---|---|---|
| 3,288,049 | 11/1966 | Schmid | 99/287 |
| 3,369,478 | 2/1968 | Black | 99/289 |
| 3,552,976 | 1/1971 | King | 99/289 |
| 4,457,216 | 7/1984 | Dremmel | 99/287 |

Primary Examiner—Robert W. Jenkins
Attorney, Agent, or Firm—Laurence R. Brown; Alfred J. Mangels

[57] ABSTRACT

The single driven part of the apparatus is an axially movable scalding cylinder, in which a piston is located which is free to move in the axial direction. This piston is positioned by a guide bush or moved with the scalding cylinder. A supporting block comprises, furthermore, an abutment for the disk of the piston. A second piston is arranged stationary or may be moved also axially against the force of a spring against a further supporting block. By the movement of the scalding cylinder ground coffee which has been inserted between the pistons is compressed and drinkable coffee is produced by feeding hot water thereto.

10 Claims, 3 Drawing Sheets

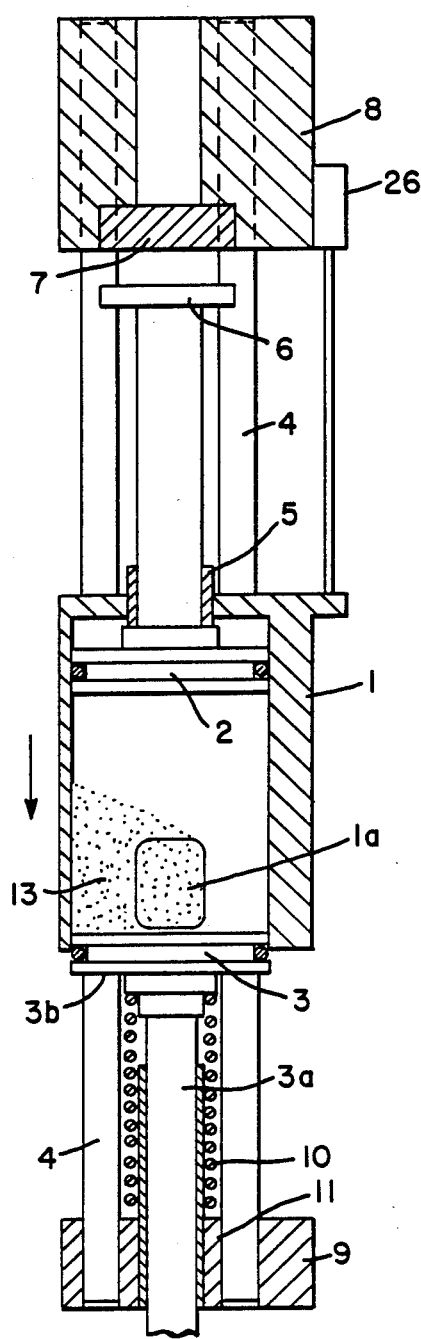
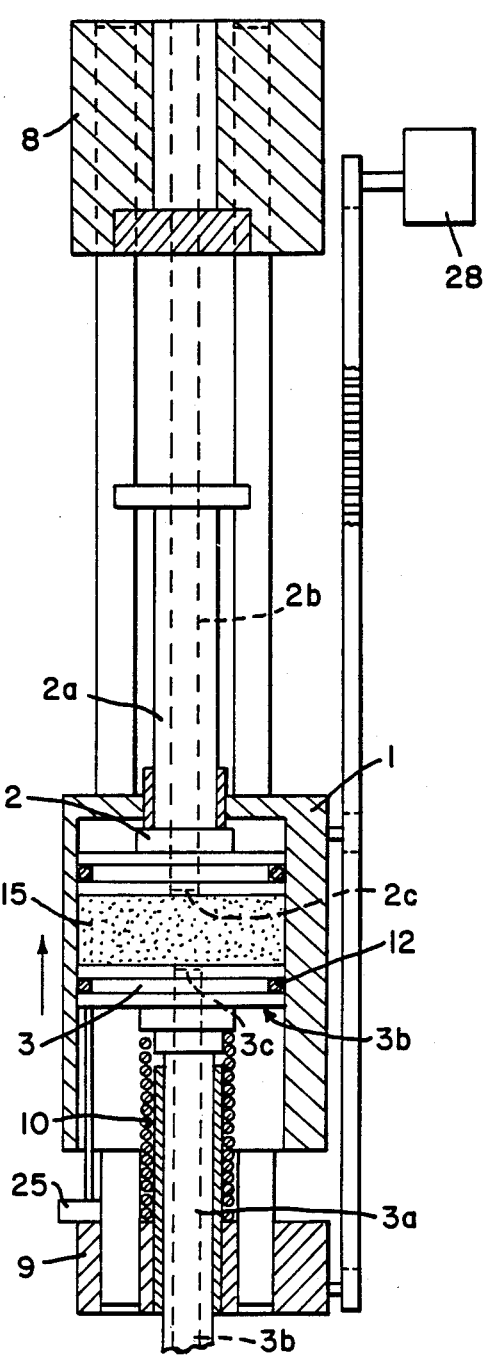

APPARATUS FOR PREPARING COFFEE

BACKGROUND OF THE INVENTION

1. Field of the Invention

The present invention relates to an apparatus for the preparing of coffee for an application in an automatic coffee-percolator, including a scalding cylinder intended for receipt of ground coffee, opposite pistons for the compressing of the ground coffee and means for feeding water or steam and for discharging the prepared coffee.

2. Description of the Prior Art

Such an apparatus, also termed extraction apparatus and including aforementioned devices is disclosed e.g. in the European Specification No. EP 0 202 517.

Accordingly, ground coffee is for instance fed in through a lateral opening in a scalding cylinder which is open at both ends of which one opening is closed off by the surface of one of the pistons and the other opening still remains open. During a further step the first piston moves now into the stationary scalding cylinder and towards the opening which now has been closed off by the second piston by a movement in the opposite direction. This causes the ground coffee to be moved away from the lateral infeed opening towards one of the ends of the scalding cylinder and be compressed as far as the first piston is moved with the aid of a contacting device which stops the movement of the piston as soon as the piston which is freely axially movable against the action of a spring has run through a predetermined spring travel stroke.

Through the ground coffee which accordingly has been thus compressed in a controlled manner water or steam supplied for instance through an axial bore in one of the piston rods is led through the scalding chamber filled with the ground coffee and the coffee thus made is led off through e.g. a similar bore in the other piston rod. The second piston is thereafter again moved into its initial position and the portion of coffee grinds pushed out by a further movement of the first piston in its initial direction of movement. Finally, the first piston moves also in the scalding cylinder into its starting position.

SUMMARY OF THE INVENTION

It is a general object of the present invention to provide a simplification of the control and drive of the moving parts of the apparatus without altering the basically correct operation.

A further object is to provide an apparatus for the preparing of coffee in an automatic coffee-percolator, including a scalding cylinder intended for receipt of ground coffee, including further a first and a second piston and piston rods belonging thereto, which pistons are allocated to the cylinder and are movable relative to each other along the axis of the cylinder and operative to define a scalding chamber and to compress ground coffee filled thereinto, which first piston closes off one of the ends of the cylinder and which second piston is movable between a working position inside the cylinder and a working position outside of the latter such to clear the other end of the cylinder allowing the first piston to push the used ground coffee out, including further means for feeding water or steam and for discharging the prepared coffee, which apparatus comprises a driving device operative to move the scalding cylinder back and forth between predetermined positions in a controlled manner along at least one longitudinal guide along its axis, which cylinder moves in the one of the directions of movement over the substantially resting second piston and positively carries thereby the first piston along until the filled in ground coffee is compressed under a predetermined force between the two pistons, and moves off the second piston when moving in the opposite direction of movement and clears the corresponding end of the cylinder and shifts relative to the first piston locked in a predetermined position such that it urges the used portion of ground coffee out of the free end of the cylinder.

The single positively driven part of the apparatus left is now the scalding cylinder only. The two axially movable pistons are brought on their own into the corresponding positions by the movement of the cylinder. Accordingly but one single driving device for controlling the entire ground coffee compressing and scalding procedure is needed.

It is quite obvious that the axial movement of the scalding cylinder can be generated by an arbitrary driving device; due to the simple control properties a drive including an electric motor and a toothed belt is preferred. An axial moving of the scalding cylinder can in the same way be also made via a threaded rod connected via a gearing to the electric motor, which threaded rod is led through the casing of the scalding cylinder, or by a crank drive. The movement may also be made by a hydraulic cylinder having a piston rod coupled suitably to the scalding cylinder.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a section through the apparatus with the scalding cylinder in the grinding position;

FIG. 2 is a section through the apparatus with the scalding cylinder in the final compressing position;

DESCRIPTION OF THE PREFERRED EMBODIMENT

Figure 3:
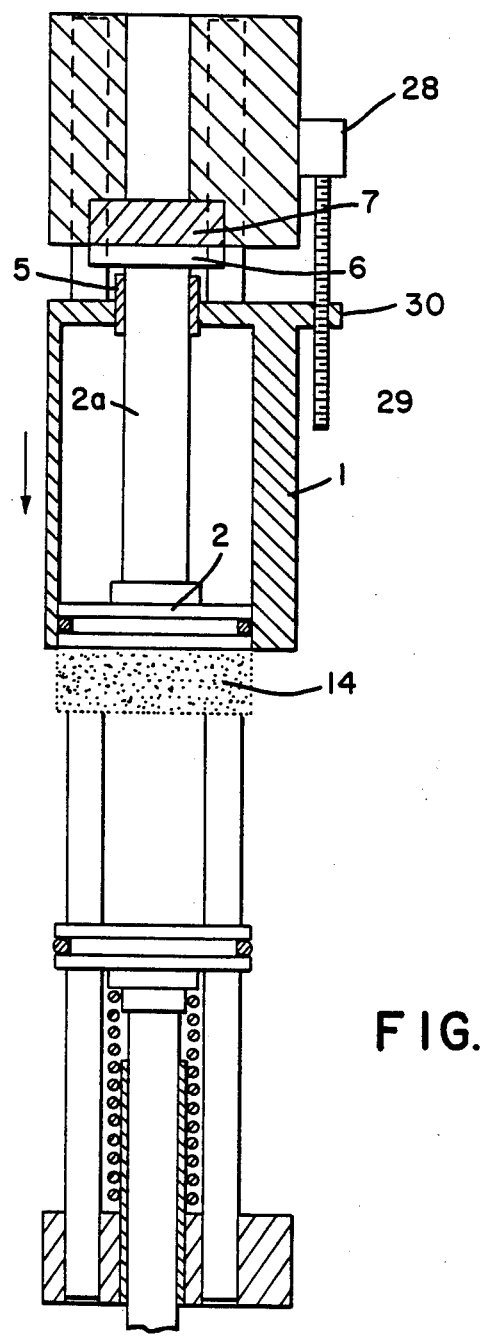
FIG. 3 is a section through the apparatus with the scalding cylinder in the coffee grinds eject position or standby position.

FIG. 1 illustrates a scalding cylinder 1 including a lateral feed opening 1a through which the ground and portioned coffee powder 13 is introduced. Here a first piston 2 is located closely over the bottom of the scalding cylinder 1 and located at its left side which piston 2 is guided and positioned as well by a sleeve 5. In the position illustrated the second piston 3 just shuts the right-sided opening of the scalding cylinder 1 off. Its piston rod 3a is supported in a guide sleeve 11 and guided in the direction of the cylinder axis whereby the sleeve 11 is mounted fixedly in a supporting block 9. Two guide rods 4 are also mounted to this supporting block 9 and their opposite ends are embedded in a further support block 8.

Because its casing comprises two bores through which the guide rods 4 are led the scalding cylinder can now be moved translatory relative to the axes of the pistons or cylinder. After the ground coffee 13 has been introduced the scalding cylinder 1 is moved in the direction of the arrow (FIG. 1), for instance by an hydraulic cylinder 26, until it reaches the position such as illustrated in FIG. 2. In addition to the hydraulic cylinder driving device 26 shown in FIG. 1 for moving scalding cylinder 1, the driving device can also be provided in the form of a toothed belt 27 as shown in FIG. 2 and including an electrical driver 28, or in the form of a crank drive (not shown), or as a rotating threaded rod 29 extending parallel to the longitudinal guide of the scalding cylinder and extending through a corresponding screw thread 30 in the casing of scalding cylinder 1, as shown in FIG. 3.

The piston 2 which has than been taken along is still located at the bottom of the scalding cylinder while the second piston 3 is located now about halfways of the depth of the scalding cylinder such that the ground coffee has been compressed. At the same time the ground coffee has been moved away from the feed opening 1a towards the bottom of the scalding cylinder such that a closed space 15 (scalding chamber) having compressed ground coffee has been formed. Due to the compression force the piston 3 has been moved slightly against the pressure of the spring 10 towards the supporting block 9. This amount of displacement is a direct measure for the compression pressure of the ground coffee which can be determined by a suitable choosing of the spring rate of the spring 10 and accordingly can stop, for instance by arranging a micro switch 25 which is operated by the lower piston surface 3b or by a cam or a groove on the piston rod 3a, the compressing movement of the scalding cylinder. This guarantees at all times a constant predeterminable compression of the ground coffee which has a large influence on the quality of the prepared coffee.

In the position shown in FIG. 2 hot water or steam is now led through the compressed ground coffee such to produce the coffee proper. This proceeds for instance via channels 2b and 3b in the piston rods 2a and 3a whereby the respective openings in the piston surface of the pistons 2 and 3 are provided with a screen 2c and 3c for their covering off. The direction of through flow of the water or prepared coffee can thereby be chosen freely. Because the water or steam is led through the chamber 15 at a high pressure the pistons 2, 3 are provided with piston sealing rings 12.

After termination of the scalding step proper the scalding cylinder 1 is moved in the direction of the arrow (FIG. 2) towards the support block 8. The piston 3 is led back into its initial position by the spring 10. FIG. 3 illustrates the scalding cylinder in the coffee grinds ejecting or stand-by position. During the reverse movement of the scalding cylinder 1 the coffee grinds portion 14 is pushed out of the cylinder by the piston 2, either already at the beginning of the movement or at the latest when the disk 6 mounted on the piston rod 2a comes to abut the abutment member 7. This abutment 7 consists for instance of a magnetic material in order to arrest the piston 2 during the forward movement of the scalding cylinder 1 into the initial position such as illustrated in FIG. 1 until it again is also moved along by the sleeve 5. It is of no importance if during the above mentioned return movement the piston 2 remains initially positioned at the bottom of the scalding cylinder or if it is moved along due to the effects of the adherence of the coffee grinds portions 14 but after the sleeve 5 coming to abut the disk 6.

In order to remove the coffee grinds portion 14 and to possibly clean the residual coffee grinds simultaneously off the contacted parts of the apparatus (e.g. piston surfaces) a hot water jet is preferably led through the bore in the piston. In such case no additional rinsing apparatus is needed.

The scalding cylinder 1 will remain now in this rest position until a next new scalding procedure.

The inventive extraction apparatus includes in comparison with a previously known apparatus as strongly simplified moving apparatus or device. This increases among others the safe working and reduces the necessary driving energy.

Figure 4:
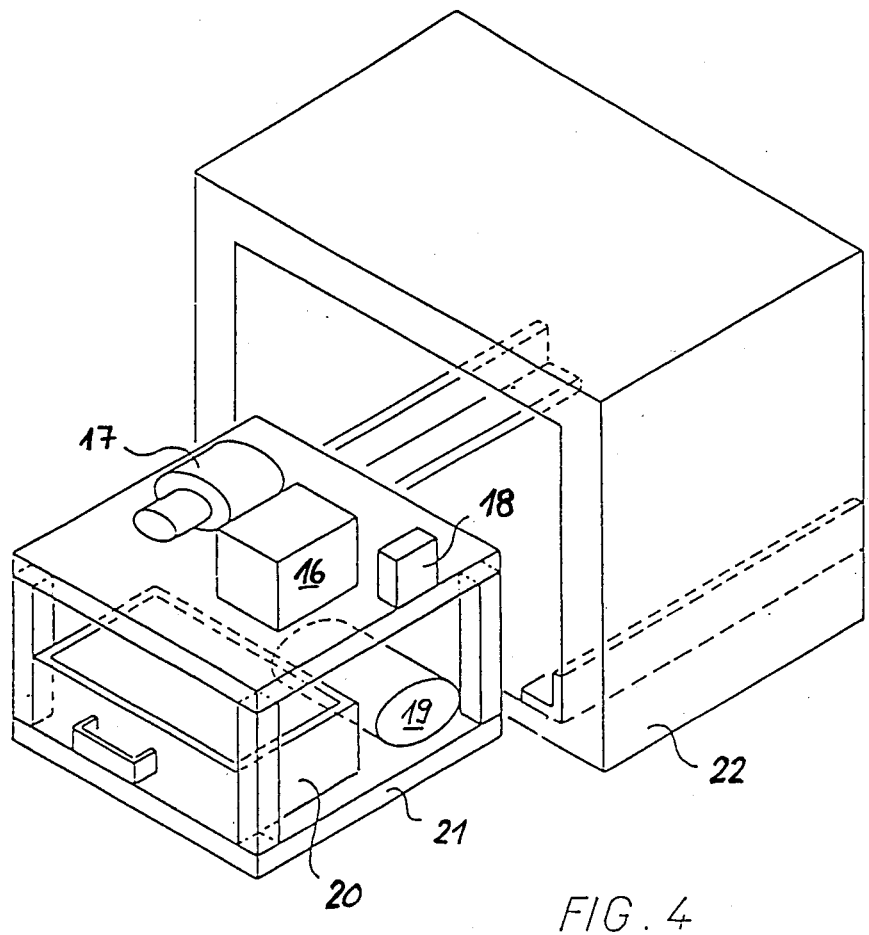
FIG. 4 is a schematic view of an insertion module in which the extraction device is integrated.

FIG. 4 illustrates schematically how such an extracting device 16 can, together with further components, such as e.g. a coffee grinder and portion dosing device 17, operating elements 18, a hot water conditioning plant 19 and a collecting drawer 20 for collecting the coffee grinds portions be arranged on a system insert tray 21. This insert tray 21 can be built into an arbitrary casing 22 in an easily exchangeable manner. This facilitates a possible repair or exchanging of one of its components. A further advantage is that in case of malfunctions possibly the entire insert tray can be exchanged and thus the time within which the coffee-percolator is out of action can be reduced to a minimum. To this end it is merely necessary to disconnect the power and water supply and to unlock a possible lock of the insert tray.

While there is shown and described a present preferred embodiment of the invention it is to be distinctly understood that the invention is not limited thereto but may be otherwise variously embodied and practiced within the scope of the following claims.

We claim:

1. An apparatus for the preparing of coffee in an automatic coffee-percolator, including a scalding cylinder intended for receipt of ground coffee, including further a first and a second piston and piston rods belonging thereto, which pistons are allocated to said cylinder and are movable relative to each other along the axis of said cylinder and operative to define a scalding chamber and to compress ground coffee filled thereinto, which first piston closes off one of the ends of the cylinder and which second piston is movable between a working piston inside said cylinder and a working position outside of latter such to clear the other end of said cylinder allowing said first piston to push the used ground coffee out, including further means for feeding water or steam and for discharging the coffee prepared, said apparatus comprising a driving device operative to move said scalding cylinder back and forth between predetermined positions in a controlled manner along at least one longitudinal guide along its axis, which cylinder moves in the one of the directions of movement over the substantially resting second piston and positively carries thereby the first piston along until the filled in ground coffee is compressed under a predetermined force between the two pistons, and moves off said second piston when moving in the opposite directions of movement and clears the corresponding end of said cylinder and shifts relative to said first piston locked in a predetermined position such that it urges the used portion of ground coffee out of the free end of the cylinder.

2. The apparatus of claim 1, in which said first piston is guided in a guide at one end of the scalding cylinder such that it is free to move between a first end position at this one cylinder end and a second end position at the other, open end of the cylinder.

3. The apparatus of claim 1, in which the piston rod of said second piston is guided in a stationary support outside of the cylinder.

4. The apparatus of claim 3, in which said second piston is supported movably or resiliently via a pressure spring against its support.

5. The apparatus of claim 4, comprising a compression control device which includes a micro switch which operates upon a predetermined path of movement of the second piston which is coupled to a compression spring and therewith stops the driving device of the scalding cylinder.

6. The apparatus of claim 1, in which each piston rod is designed as hollow rod in which the channel opens at the piston in an opening of the piston face surface which is covered by a screen.

7. The apparatus of claim 1, in which said first piston comprises at the section of its piston rod located outside of said scalding apparatus means operative to move, depending from the operative condition, to abut the guide in one end of the cylinder and a stationary abutment located outside of the cylinder and which determines the locking position.

8. The apparatus of claim 1, in which said scalding cylinder comprises at least one lateral feed opening allowing the feeding of the ground coffee.

9. The apparatus of claim 1, in which said driving device of the scalding cylinder comprises a toothed belt or crank drive including an electrical driver, a hydraulic working cylinder or a rotating threaded rod extending parallel to the longitudinal guide of the scalding cylinder and extending through a corresponding screw thread in the casing of the scalding cylinder.

10. The apparatus of claim 1, which apparatus is designed together with other machine components as slide-in tray supported exchangeably in an apparatus frame.

* * * * *